July 29, 1947.  J. E. CROUCH  2,424,601
ICOSAHEDRAL MAP
Filed Jan. 25, 1944  2 Sheets-Sheet 1
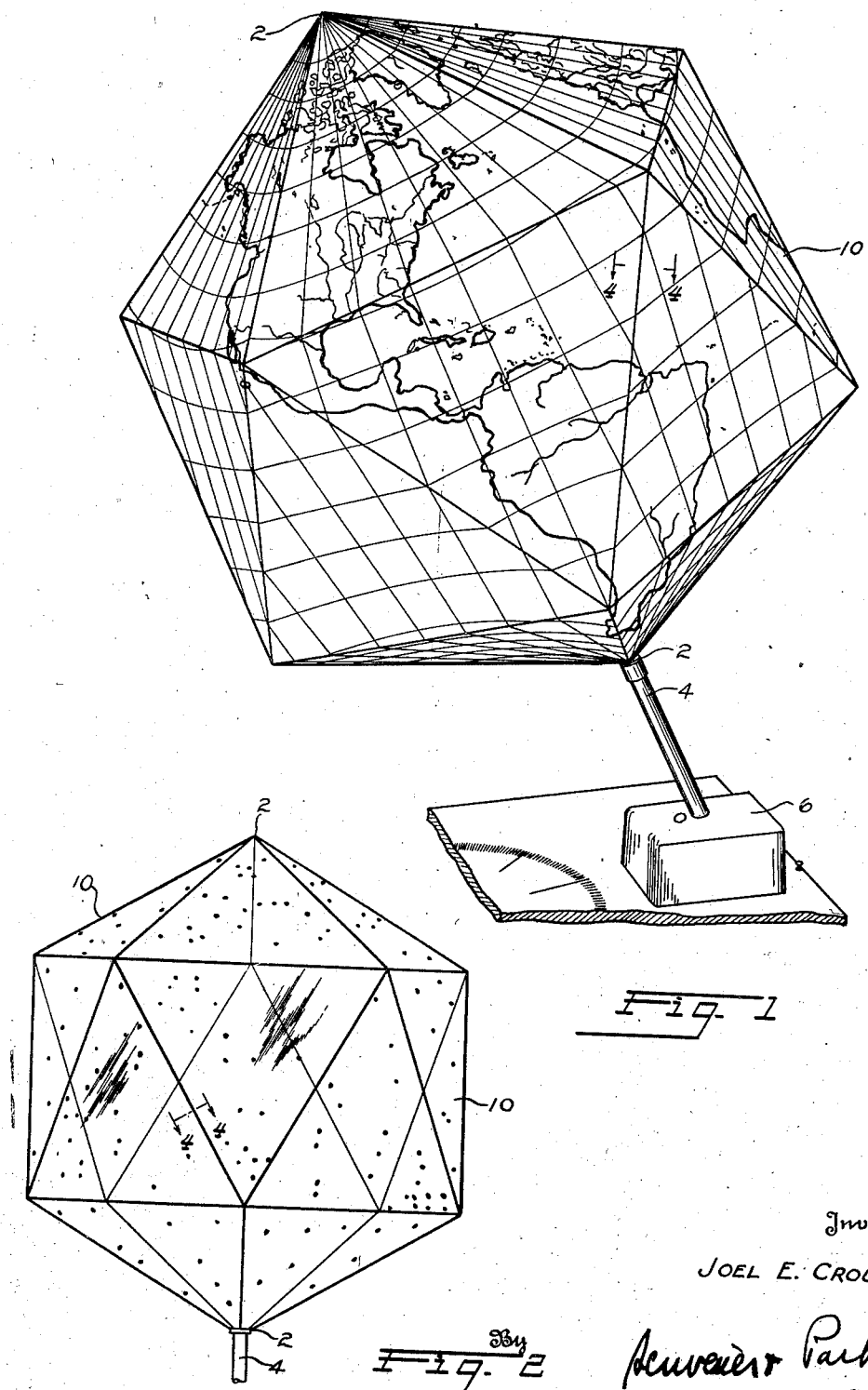
Inventor
JOEL E. CROUCH July 29, 1947.     J. E. CROUCH     2,424,601
ICOSAHEDRAL MAP
Filed Jan. 25, 1944     2 Sheets-Sheet 2
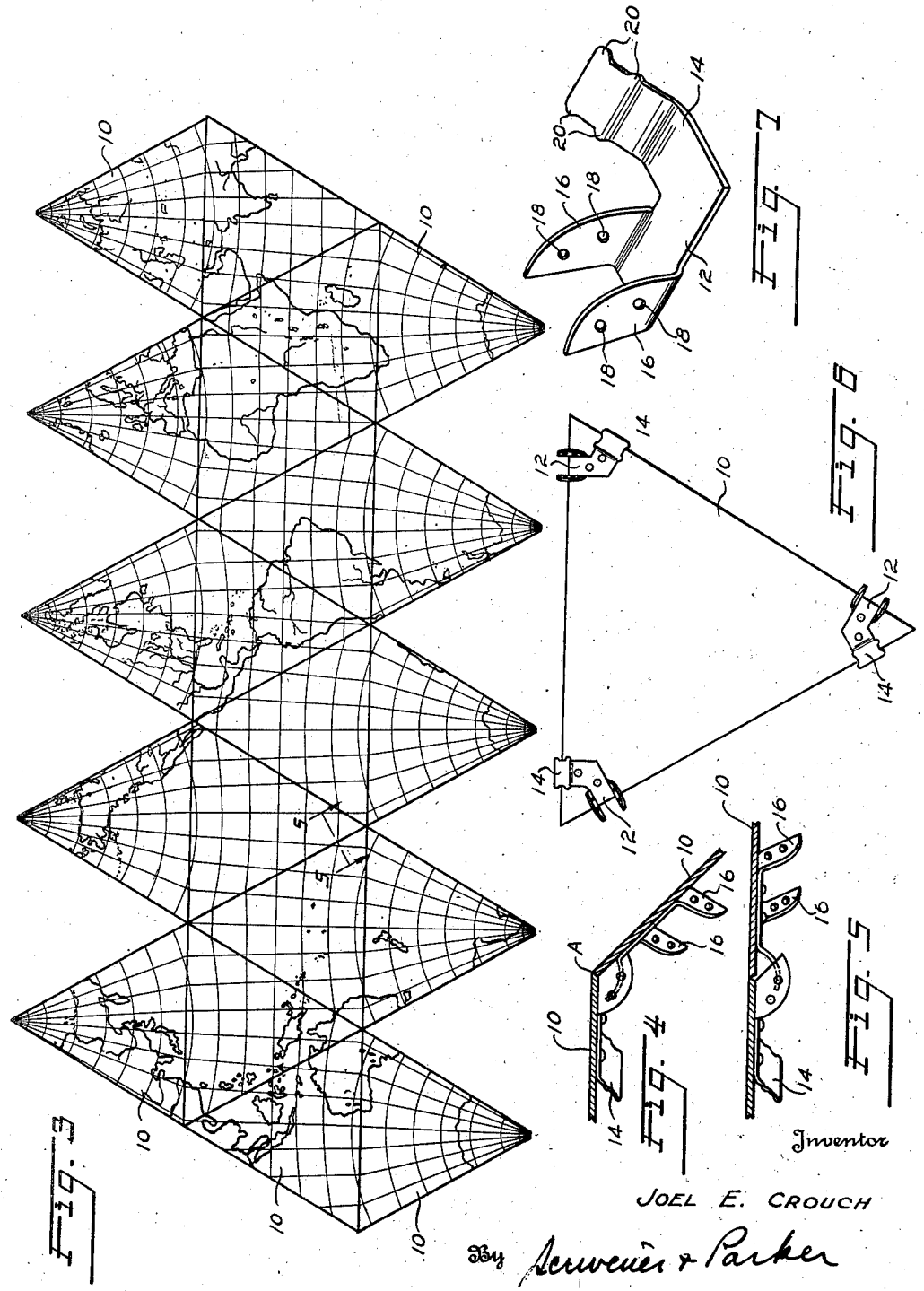
Inventor
JOEL E. CROUCH
By Scrivener + Parker
Attorney Patented July 29, 1947

2,424,601

UNITED STATES PATENT OFFICE 2,424,601

ICOSAHEDRAL MAP

Joel E. Crouch, State College, Pa.

Application January 25, 1944, Serial No. 519,681

13 Claims. (Cl. 35—46)

1

This invention relates in general to universal maps of the earth or of the celestial sphere and, more particularly, to the representation of the features of such surface or sphere on a polyhedral figure which approximates a globe.

The sphere is, of course, the figure on which the surface of the earth or the locations of the heavenly bodies may be most accurately represented, because of the fact that its shape corresponds most nearly to that of the earth and to the visual aspect of the celestial sphere. The sphere suffers, however, from the defects that only one-half of it may be seen at one time when in its spherical form and that it may not spread out flat for visual inspection of the whole surface thereof. It is a common expedient in the art to obviate the latter defect of the sphere by projecting the representations of the terrestrial or celestial sphere on the surface of a polyhedron which may be spread out flat by unfolding. Various methods of projection from the sphere to the polyhedron are known, among them being the stereographic, orthographic and gnomonic. My invention has to do with such polyhedral representations of the surface of the earth and of the heavens and its principal object has been to provide a new and improved polyhedral device of this character.

It has therefore been the principal object of my invention to provide a polyhedral representation of the terrestrial or celestial sphere which will be in the form of a regular icosahedron and on the twenty faces of which the features of the terrestrial or celestial sphere are preferably projected from a sphere whose surface is tangential to the midpoint of each of the twenty equilateral triangles which form the sides of the icosahedron.

A further object of my invention has been to provide an icosahedral map having separable faces whereby they may be laid out to form a flat map and may be moved about to form various combinations best representing the part of the terrestrial or celestial sphere being studied.

A further object has been to provide means for attaching together the separate adjacent faces of the icosahedral map in such a way that when the map is in its icosahedral form the faces thereof are firmly and rigidly, but separably, attached together in their correct angular relationship, and when the map is in its flat form the parts thereof are separably but firmly attached together in the required uni-planar relation.

Other objects and features of novelty of the invention will be made apparent by the following

2 description and the annexed drawings which, it will be understood, are only illustrative of the invention and impose no limitation thereon not imposed by the appended claims.

In the drawings forming part of this application, in which similar reference numerals refer to like parts, Fig. 1 is an elevational view of an icosahedral map of the earth's surface, according to my invention;

Fig. 2 is an elevational view of an icosahedral map of the heavens, according to my invention;

Fig. 3 is a plan view of the map of Fig. 1 when arranged in flat position;

Fig. 4 is a view taken on line 4—4 of Figs. 1 and 2, showing the means for attaching together adjacent faces of the icosahedron;

Fig. 5 is a view taken on line 5—5 of Fig. 3 showing the attaching means in position to hold the adjacent faces in flat or uni-planar relation;

Fig. 6 is a view of the reverse or under side of one of the twenty similar and equal faces forming the icosahedral map and showing the attaching clips in place thereon; and Fig. 7 is a perspective view of the attaching clip according to my invention.

In Fig. 1 of the drawings there is disclosed an icosahedron having the map of the world on the outside surface thereof. The figure is preferably so arranged that the earth's axis X—X passes through opposite corners or apices 2, 2 thereof, as shown, although it may pass through the center points of opposite side faces if desired. A metal rod 4 may occupy the position of the earth's axis and have its lower end received in an inclined opening in a base 6 whereby the icosahedral figure, which is supported on the rod by an abutment 8, occupies a position corresponding to that of the earth. The figure disclosed in Fig. 1 is preferably opaque, although it may be transparent or semi-transparent for internal illumination, while that disclosed in Fig. 2 and which represents the celestial sphere, is preferably transparent in order that an observer may look through the near side of the figure or of a part thereof, and view the heavenly bodies represented on the far side thereof.

The figures disclosed in both Figs. 1 and 2 are both regular icosahedrons, i. e., polyhedrons having twenty faces which are equilateral triangles of equal size. Instead of forming a solid icosahedral figure I construct each figure of twenty flat panels or plates 10 all of which are of the same size and each of which is shaped as an equilateral triangle, and I provide means which rigidly connect these plates together in the proper angular relationship to provide an icosahedron and which also connect the plates together when they are taken from their icosahedral relationship and are laid out in a single plane to provide a flat map of the earth or heavens as shown in Fig. 3.

The means provided by my invention for connecting the plates together in the two relationships described are disclosed in Figs. 4, 5, 6 and 7 and comprise clip members which are of the same size, shape and construction and which may be made of metal, plastic, or any other desirable and suitable material. Each clip comprises a piece of stamped sheet material having two parts 12, 14 which, in the example being described, extend from each other at an angle of 120° whereby the clip may be placed adjacent any apex of any side of the icosahedron in such a manner that each part of the clip will be positioned at right angles to one of the edges forming the apex, as shown in Fig. 6. One part 12 of the clip has ears 16 bent upwardly from the sides thereof and which extend from the clip in a direction away from the plate 10 to which the clip is attached. Each of these ears or wings has at least two spaced openings 18 therein. If only two openings are provided they will be spaced along a line which is inclined at an angle of 21° to the plane of the attached panel and will also be spaced along an arc having its center at the point A where the outer surfaces of the adjacent panels meet. If more than two openings are provided they will be spaced along the described arc. The openings in one wing will be aligned with those of the other. The other part 14 of the clip has generally parallel sides, each of which is provided with at least two lugs 20 which are spaced apart by a distance equal to the spacing of the openings 18 in each wing 16, the lugs on one side edge of the part 14 being aligned with those on the other side edge. The outer end portion of the part 14 is bent from the general plane of the clip in a direction away from the panel 10 and in such a manner that the lugs on each side thereof are spaced along a line or an arc which corresponds to the line or arc along which are spaced the openings into which the lugs must fit. Thus, if only two spaced pairs of lugs are provided they will be spaced along a line which is inclined at an angle of 21° to the face of the attached panel and the end of the part 14 may be bent from the flat part of the clip at that angle. If more than two pairs of lugs are provided they will be spaced along an arc having its center at the point A where the outer faces of the attached panels meet and the end of the part 14 may be bent from the flat part of the clip along such an arc.

As shown in Fig. 6, one clip is arranged at each apex of each side plate 10 of the icosahedron, on the under or inner side thereof, and in such a way that the end or part including the wings 16 is adjacent one edge of the plate and the end or part having the lugs 20 is adjacent the other edge of the plate. When the icosahedron is to be assembled the edge of one plate 10 is brought adjacent that of a second plate, whereby four clips will be brought into attaching relation. The lugs on the opposite side edges of two of these clips will be engaged in the openings in the wings of the other two thereby holding the two plates together at an angular relation of 138° 20′ which is the proper dihedral angle between the two adjacent faces of an icosahedron. The two plates 10 will be held firmly in this angular relation by reason of the engagement of at least two lugs in at least two corresponding openings on each side of each clip, whereby no pivoting movement may take place. The ears or wings 16 are preferably biased slightly inwardly, or toward each other, whereby they exert resilient pressure on opposite sides of the part 14 of the clip attached thereto, thereby holding the lugs in the respective openings. All of the twenty plates 10 may be assembled to form the icosahedral map by attaching the properly adjacent plates together, by means of the clips, until the figure is completed. It will be found that the clips will hold the parts in rigid, yet separable relation, whereby a firm and rigid figure is produced.

If it is desired to take the icosahedral map apart and assemble the twenty faces thereof in flat, or co-planar, relation as shown in Fig. 3, the plates 10 are separated by removing the four lugs 20 of each clip from the four openings 18 with which they are engaged. The plates are then laid flat in any desired relationship and are attached together by inserting the aligned outermost lugs 20 within the aligned outermost openings 18, whereby adjacent plates are held together in pivotal relationship which permits them to be brought into flat, or co-planar, position and relation. The plates may be separated, in order to be moved to desired relations and positions, by separating the interlocked outermost lugs and openings. Joining and separation of the lugs and openings is facilitated by inclination of the side walls of the lugs, as shown in Fig. 7. It will be seen that any number of plates less than twenty may be assembled in the manner described in order to provide a representation of any part of the earth. Thus, the five panels forming the north or south polar part of the globe may be attached together or laid flat in order to illustrate those parts of the earth's surface.

While the clips have been described as being separate from, but adapted to be attached to the panels which form the icosahedron, they may be formed or cast integrally with such panels if desired. Further, while the described structure of the clips has been such as to make them particularly useful in holding the parts of an icosahedron, it will be apparent that they may be modified to permit their use with panels of other shapes than equilateral triangular and with panels which must be held together at a dihedral angle other than that between adjacent faces of an icosahedron, all without departing from the invention. Further, while the clips described and illustrated in this application are provided with openings 18, such openings may be replaced by equivalent means such as depressions within which the ends of the lugs 20 are received.

I have found that certain advantageous results are produced by positioning the map of the world on the twenty plates 10 in the manner disclosed in the drawings. In this preferred positioning the meridian at Greenwich is passed along the north-south centerline of one of the north pole triangular plates whereby it necessarily passes between triangular plates at the south pole of the figure. The other parts of the map are positioned accordingly and as required. With this positioning, the other parts of the map fall on triangular plates in such a way that land and water areas are most advantageously shown and may be most advantageously grouped. This positioning causes the various five-sided pyramids of the icosahedron to show integrated land and sea regions of the earth's surface, among these being North America, South America, Europe-Africa and Western Asia, Australia-East Indies, the Atlantic ocean and the Pacific ocean. The stars, suns, constellations, etc., may be so positioned on the transparent icosahedral figure shown in Fig. 2 as to form a map of the heavens in which they are most advantageously positioned. Thus, for example, a familiar constellation such as the Big Dipper (Ursa Major) may be positioned on a single triangular panel in order that it may be best seen.

The map of the earth, as shown on the surface of a sphere, may be transferred to the surface of an icosahedron by any desired method of projection. It is preferred, however, to effect this by gnomonic projection, i. e., projection from the center of a sphere the center of which coincides with that of the icosahedron. This method of projection is preferred because it shows every great circle on the sphere as a straight line on each panel of the icosahedron.

While I have described and illustrated certain forms which my invention may take, it will be understood by those skilled in the art that other embodiments, as well as modifications of those disclosed, may be made without departing in any way from the spirit or scope of the invention, for the limits of which reference must be had to the appended claims.

I claim:

1. A universal map device comprising twenty separate flat equilateral triangular panels of equal size, means for rigidly and separably connecting said panels together to form an icosahedron, and a universal map shown on the icosahedron with each component part thereof appearing upon the respective panels in proper sequence.

2. A universal map device comprising twenty separate flat equilateral triangular panels of equal size, means for rigidly but releasably connecting said panels together to form an icosahedron, means for connecting said panels together in coplanar relation, and a universal map shown on the icosahedron with each component part thereof appearing upon the respective panels in proper sequence.

3. A universal map device comprising twenty separate flat equilateral triangular panels of equal size, means carried by each panel for rigidly but releasably connecting said panel along its edges to the edges of three other panels in the angular relationship existing between the sides of an icosahedron, and a universal map shown on the icosahedron with each component part thereof appearing upon the respective panels in proper sequence.

4. A universal map device comprising twenty separate flat equilateral triangular panels of equal size, means carried by each panel for rigidly but releasably connecting said panel along its edges to the edges of three other panels in the angular relationship existing between the sides of an icosahedron, said means also including means for connecting said panel along its edges to the edges of three other panels in co-planar relation, and a universal map shown on the icosahedron with each component part thereof appearing upon the respective panels in proper sequence.

5. A device for rigidly connecting two panels in dihedral angular relation, comprising means carried by one panel and having formed therein a plurality of spaced pairs of aligned openings, and a plurality of spaced pairs of aligned lugs carried by the second panel, each of said pairs of lugs being adapted to be received in one of said pairs of openings.

6. A device for rigidly connecting two panels in dihedral angular relation, comprising spaced parts carried by one of the panels and having a plurality of pairs of aligned openings therein which are spaced along an arc having its center at the outer edge of said panel and a part carried by the other panel and extending therefrom along an arc having a radius equal to that of the arc along which the openings are spaced and having a plurality of pairs of laterally aligned lugs spaced therealong and which are adapted to be respectively received in the pairs of openings in the parts carried by the first panel.

7. A device for rigidly connecting two panels in dihedral angular relation, comprising spaced parts carried by one of the panels and having a plurality of pairs of aligned openings therein which are spaced along a line extending at an angle to one face of the panel and in a direction toward the other panel, and a part carried by the other panel and extending therefrom at an angle equal to that of the line along which the openings are spaced and having a plurality of pairs of laterally aligned lugs spaced along the sides thereof and which are adapted to be respectively received in the pairs of openings in the parts carried by the first panel.

8. As a new article of manufacture, a device comprising a flat strip having parallel ears turned up from its opposite edges at one end thereof, said ears having a plurality of pairs of aligned openings therein which are spaced along a line extending at an angle to the flat strip, the other end of said device being bent from the plane of the flat strip at an angle equal to that of the line along which the openings are spaced and having a plurality of pairs of aligned lugs extending from the opposite edges thereof.

9. As a new article of manufacture, a device comprising a flat strip having parallel ears turned up from its opposite edges at one end thereof, said ears having a plurality of pairs of aligned openings therein which are spaced along an arcuate line, the other end of said device being bent from the plane of the flat strip and having a plurality of pairs of aligned lugs extending from the opposite edges thereof.

10. As a new article of manufacture, a flat equilateral triangular panel forming part of a set of twenty such panels, means carried by said panel for rigidly but releasably connecting it along its edges to the edges of three other similar panels in the angular relationship existing between the faces of an icosahedron, and a component part of a universal map shown on the face of said panel.

11. As a new article of manufacture, a flat equilateral triangular panel forming part of a set of twenty such panels, means carried by said panel for rigidly but releasably connecting it along its edges to the edges of three other panels in the angular relationship existing between the faces of an icosahedron, said means also including means for connecting said panel along its edges to the edges of three other similar panels in co-planar relation, and a component part of a universal map shown on the face of said panel.

12. As a new article of manufacture, a set of twenty separate flat equilateral triangular panels of equal size, means carried by each of said panels for rigidly but releasably connecting it along its edges of the edges of three other similar panels in the angular relation existing between the sides of an icosahedron, and a universal map shown on said panels with each component part thereof appearing upon the respective panels in proper sequence.

13. As a new article of manufacture, a set of twenty separate flat equilateral triangular panels of equal size, means carried by each of said panels for rigidly but releasably connecting it along its edges to the edges of three other panels in the angular relation existing between the sides of an icosahedron and for alternatively connecting it to such three panels in co-planar relation, and a universal map shown on said panels with each component part thereof appearing upon the respective panels in proper sequence.

JOEL E. CROUCH.

REFERENCES CITED

The following references are of record in the file of this patent:

UNITED STATES PATENTS

| Number | Name | Date |
|---|---|---|
| 158,581 | Fitz | Jan. 12, 1875 |
| 185,889 | Boorman | Jan. 2, 1877 |
| 201,722 | Topham | Mar. 26, 1878 |
| 217,671 | Allen | July 22, 1879 |
| 263,886 | Fitz | Sept. 5, 1882 |
| 418,455 | Gray | Dec. 31, 1889 |
| 1,629,582 | McClintock | May 24, 1927 |
| 1,928,025 | McEwan | Sept. 26, 1933 |
| 2,153,053 | Smith | Apr. 4, 1939 |
| 600,610 | Cowles | Mar. 15, 1898 |
| 1,222,058 | Whitlock | Apr. 10, 1917 |
| 2,110,366 | Johnson | Mar. 8, 1938 |
| 501,136 | Gregory | July 11, 1893 |
| 137,075 | Harrington | Mar. 25, 1873 |
| 508,298 | Fulton | Nov. 7, 1893 |
| 538,261 | Kennedy | Apr. 30, 1895 |
| 1,472,536 | Thomson | Oct. 30, 1923 |

FOREIGN PATENTS

| Number | Country | Date |
|---|---|---|
| 13,481 | Great Britain | 1851 |
| 179,440 | France | May 11, 1922 |
| 161,045 | Great Britain | Apr. 7, 1921 |
| 384,191 | Great Britain | Dec. 1, 1932 |